May 17, 1955 R. I. N. WEINGART 2,708,406

DEVICE FOR RECORDING ACCUMULATOR READINGS

Filed Dec. 31, 1952

3 Sheets-Sheet 1

INVENTOR.
RICHARD I. N. WEINGART
BY John P. Chandler
his ATTORNEY.

May 17, 1955 R. I. N. WEINGART 2,708,406
DEVICE FOR RECORDING ACCUMULATOR READINGS
Filed Dec. 31, 1952
3 Sheets-Sheet 2
FIG. 4
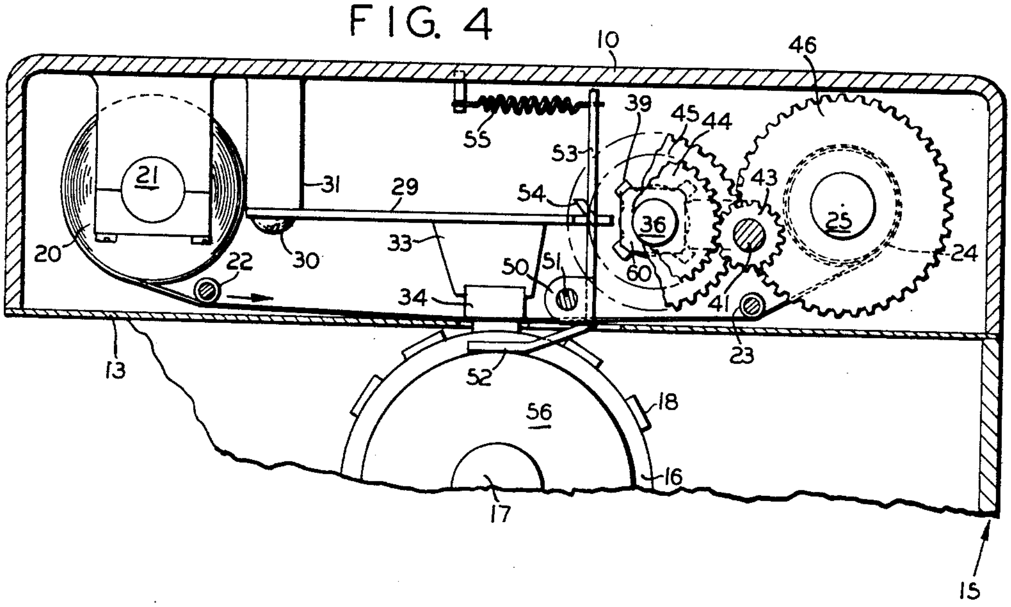
FIG. 5
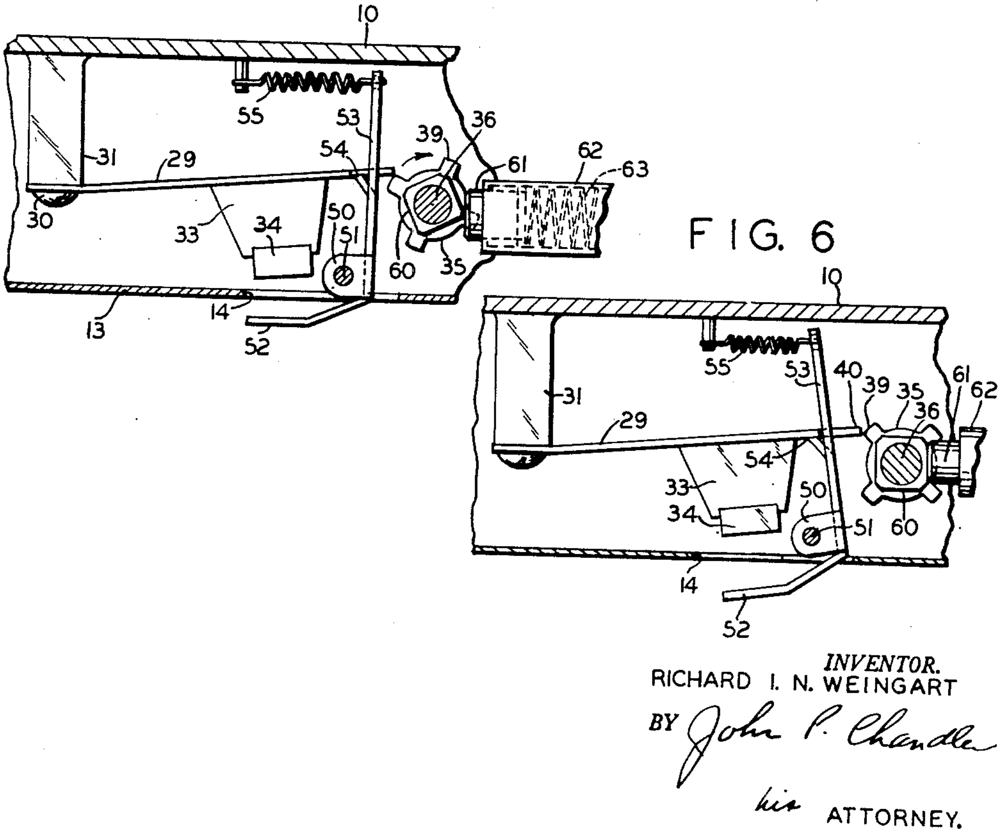
FIG. 5, FIG. 6
INVENTOR.
RICHARD I. N. WEINGART
BY John P. Chandler
his ATTORNEY.

May 17, 1955 R. I. N. WEINGART 2,708,406

DEVICE FOR RECORDING ACCUMULATOR READINGS

Filed Dec. 31, 1952

3 Sheets-Sheet 3

INVENTOR.
RICHARD I. N. WEINGART

BY John P. Chandler his ATTORNEY.

2,708,406

DEVICE FOR RECORDING ACCUMULATOR READINGS

Richard I. N. Weingart, New York, N. Y.

Application December 31, 1952, Serial No. 328,835
4 Claims. (Cl. 101—238)

This invention relates to a portable device for recording readings on an accumulator and relates more particularly to an improved apparatus for taking readings from meters or counters of every description by printing the reading on a paper web enclosed within the recording apparatus and wherein means are provided for moving the web one increment of travel after each recording so as to present a fresh space for the printing of the next succeeding reading. The columns, however, are accurately aligned so that when the record strip reaches the accounting office the record may be readily transferred to an adding machine.

The device of the present invention has particular usefulness in connection with pari-mutuel and daily double machines used at race tracks wherein readings must be taken at the start of each race for computation. Machines of this character have record wheels wherein the totals are visible through a sight opening and which are copied down by the auditor's assistant who travels from machine to machine. It is common to make errors under this procedure and the time required for copying down the figures is considerable.

An important object of the present invention is to provide a novel portable recorder which the assistant merely applies to the accumulator, the recorder and the accumulator employing special guiding means for moving the recorder to a fixed position and when the exact position is arrived at the reading is automatically printed on the record roll without any possibility of error on the part of the operator.

Another object of the present invention is to provide a recording instrument which completely eliminates human errors and wherein the only action necessary by the operator is to place the recorder on guide means associated with the accumulator and move the recorder to its innermost position at which time the record is printed on the paper roll and the paper is automatically moved to position a fresh area on the paper adjacent to that just printed.

A further object of the invention is to provide a noval latch arrangement for holding a spring-urged, printing platen structure in retracted spring-loaded position after each impression has been printed. When the recording device is applied to the counter, meter or other accumulator some portion of the former contacts a surface of the latter, thus releasing the latch and moving the platen and the paper which travels thereover, sharply against the printing type, and making a clear, sharp impression.

In the case of race track machines the printing wheels may print totals, the number of the specific machine, the time of printing, etc., and the portable recording device of the present invention may be arranged for printing multiple lines of type, as in the case of the daily double machines, or a single line of type which is the arrangement for most kinds of use and which is the one illustrated in the drawings.

In the drawings:

Fig. 4 is a transverse section taken on line 4—4 of Fig. 2.

Fig. 5 is a broken section showing part of the apparatus of Fig. 4 but showing the parts in a different position.

Fig. 6 is similar to Fig. 5 but shows the platen in fully retracted or inoperative position.

Figures 1, 2:
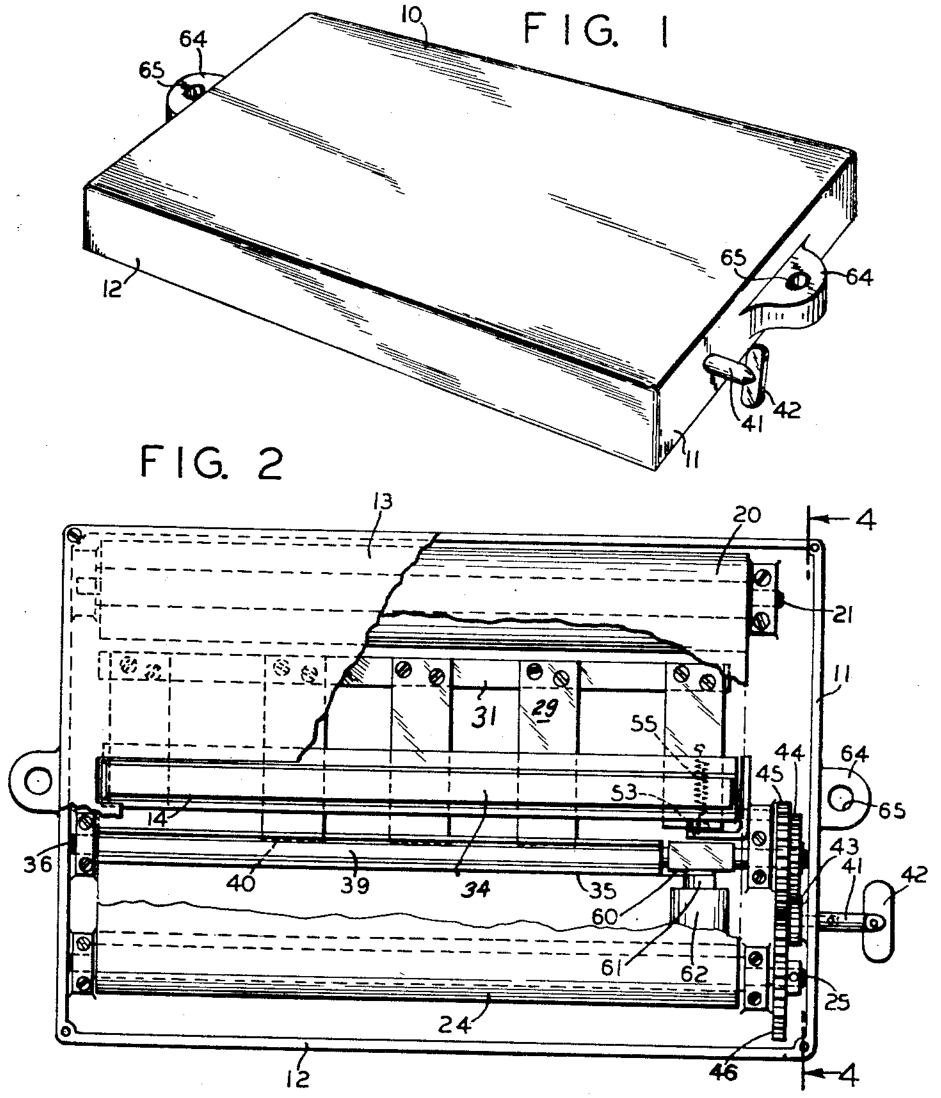
Fig. 1 is a perspective view of the recording device of the present invention.
Fig. 2 is a bottom plan view thereof, partially broken away.
Figure 3:
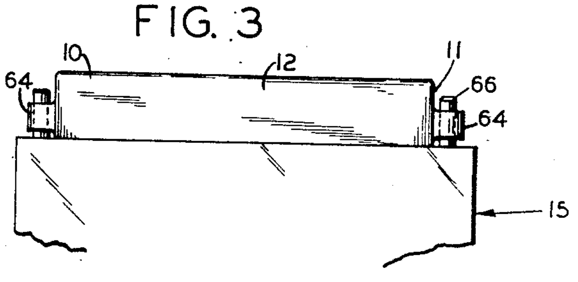
Fig. 3 is a broken side elevation showing the recorder in place on the accumulator.

One embodiment of the present invention is shown in Figs. 1 to 6 and comprises a frame which may include a housing having a top wall 10, end walls 11 and side walls 12. The lower end of the housing may be closed by a closure plate 13 having an opening 14 for the operating face of the platen structure.

The recorder is adapted to be affixed temporarily to the open end of any instrumentality which may be broadly classed as an accumulator which is shown at 15 and which is provided with one or more record wheels 16 carried on a shaft 17 and having raised numerical type elements 18 extending around their peripheries.

One advantage of the recorder of the present invention resides in the fact that countless thousands of existing meters and counters may be serviced by the recorder with very little change in the meters. In such existing accumulators the record wheels have numerical figures which can be read visually and the only change required is to replace said record wheels with type printing wheels. The machine of the present invention preferably employs a paper web carrying a "one time" carbon sheet so the numerals on the wheels are reversed from the usual left-to-right arrangement in order that the proper arrangement is visible on the printed web.

The feed roll 20 is carried on a shaft 21 journalled in the housing and the paper passes around an idler roller 22 whose lower surface is disposed just above the lower wall of the housing. It then passes around another idler 23 adjacent the opposite end of the housing and onto a take-up roller 24 carried on a shaft 25.

The platen structure includes a plurality of plates 29 formed of springy sheet metal. If desired, a single, relatively wide plate may be employed. These plates are secured at 30 to the lower end of a transverse boss 31 extending downwardly from the upper wall of the housing. Because of the relative shortness of the stroke a better printing impression is secured by increasing the mass of the movable end of the platen structure and to that end a weighted member 33 extends longitudinally of the free ends of the plates and on the lower surface of the weighted member there is affixed a resilient strip 34 which provides the impact delivering face.

The platen structure is raised to the spring-loaded or inoperative position of Fig. 6 by means of a multi-splined sleeve 35 keyed to a shaft 36 journalled in the housing. The sleeve is shown as having four splines 39 which contact the free terminals 40 of the longer spring plates as the sleeve is rotated one increment in a clockwise direction when viewed as in Figs. 4, 5 and 6. Rotation is effected by means of a winding shaft 41 having a thumb turn 42. Keyed to this shaft is a small gear 43 which drives a larger gear 44 keyed to shaft 36. Also keyed to the latter shaft is a somewhat larger gear 45 which drives a gear 46 keyed to shaft 25 for the take-up roll. It will be seen from the foregoing that substantially one half rotation of shaft 41 causes a one-quarter rotation to splined sleeve 35 and on each such motion the platen structure is raised upwardly. It is retained in this spring-loaded position by means of a bell-crank lever provided with bearing ears 50 journalled on shaft 51 and provided with a lever arm 52 which acts as a trigger, and lever arm 53 having a projection 54 which acts as a sear or latch and underlies one of the shorter plates.

A spring 55 urges the lower lever arm 52 downwardly and the latch into latching position. This lever arm or trigger contacts some portion of the meter which in the instance shown may comprise a roller 56 freely carried on shaft 17. It will be apparent from the foregoing that when the housing is moved downwardly to a point wherein the latch is released, the platen structure moves the paper against the type with an impact blow, and clearly prints the indicia on the paper.

By employing a carbon sheet with the paper the need for inking the type is eliminated and there is thus no need for cleaning the type. In many instances it may be desirable to provide a double roll of carbon-backed paper and thus make a duplicate record.

Centering means for the splined sleeve may comprise a non-circular bushing 60 keyed to shaft 36 and provided with as many flat surfaces as splines on the sleeve. A plunger 61 mounted for sliding movement in a cylinder 62 is urged against the flats by a spring 63.

Means for properly positioning the housing on the meter may comprise ears 64 at opposite ends of the housing and provided with openings 65 which receive pins 66 on the meter. The depth of the ears is sufficient to require level downward movement of the housing if binding is to be eliminated. If the ears were thinner, two trigger mechanisms, one on each side, could be employed. In any event, in the construction shown, the trigger means is intimately associated with the registering means and such trigger means is manually actuated, i. e., it is actuated when the frame is moved to "home" position. It will be appreciated that any other manual means may be employed for actuating the trigger when the frame is in printing or home position.

The use of the term "paper" upon which the reading is printed is not limiting the printing web to any specific material.

Figures 7, 8, 9:
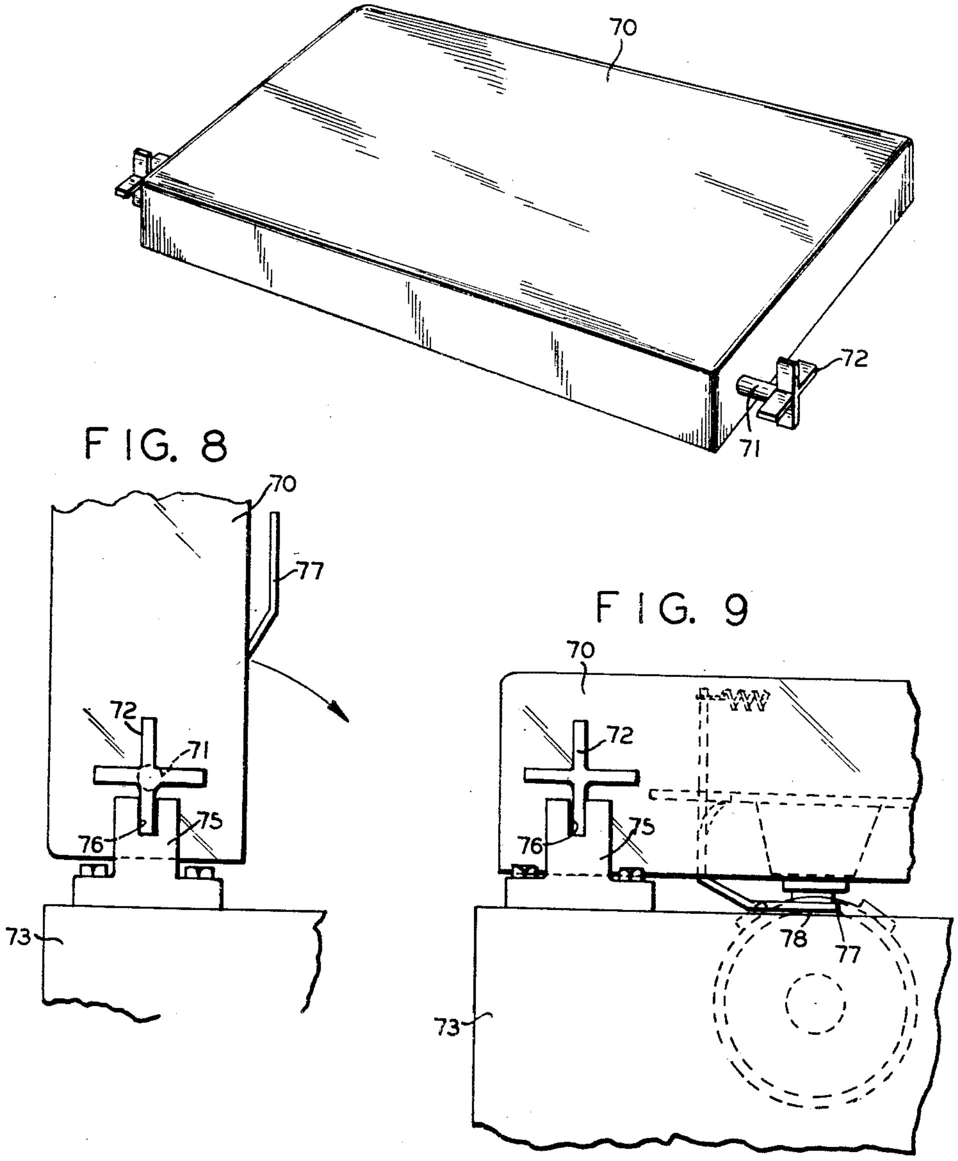
Fig. 7 is a perspective view showing a modified form of the recorder.
Fig. 8 is a broken end elevation showing the method of application of the recorder to the accumulator.
Fig. 9 shows the relation of the parts at the moment of impact.

In the modified form of the invention shown in Figs. 7, 8 and 9 the mechanism contained in the housing 70 is largely the same as in the first embodiment. In this case, however, instead of the hand wound shaft 41, shaft 71 carries a four part crank 72 and the meter 73 has on its upper wall brackets 75 having vertical recesses 76 to receive one of the crank portions. The housing is then applied vertically to the meter housing and the brackets serve as aligning means. The recorder housing is now moved downwardly through an arc of 90°, thus setting the platen structure and, as the trigger 77 contacts surface 78, the printing is effected.

While two forms or embodiments of the invention have been shown and described herein for illustrative purposes, and the construction and arrangement incidental to two specific applications thereof have been disclosed and discussed in detail, it is to be understood that the invention is limited neither to the mere details or relative arrangement of parts, nor to its specific embodiments shown herein, but that extensive deviations from the illustrated forms or embodiments of the invention may be made without departing from the principles thereof.

What I claim is:

1. A recording device to be applied to an accumulator for obtaining a printing of the reading thereof and comprising a housing provided with locating means for obtaining proper register on the accumulator, a platen structure comprising a spring plate mounted in the housing with one end free to travel, a resilient impact-delivering member carried by such free end, means for latching the free end under spring tension in inoperative position comprising a pivoted bell crank lever, one arm of which includes a latch, and the other arm of which is arranged to contact a portion of the accumulator when the housing reaches a proper position thereon to release the latch, a feed roll journalled in the housing, a web of paper carried thereby and which passes over the platen structure, a take-up roll for the paper and manually wound means for turning the take-up roll after each printing and for retracting the platen structure to latching position.

2. A recording device to be applied to an accumulator for obtaining the readings thereof and comprising a housing provided with locating means for obtaining proper register on the accumulator, a platen structure comprising a spring plate mounted in the housing with one end free to travel, a weighted member and a resilient impact-delivering member carried by such free end, means for latching the plate under spring tension in inoperative position comprising a pivoted bell crank lever, one arm of which includes the latching means, and the other arm of which is arranged to contact a portion of the accumulator when the housing reaches a proper position thereon to release the latch, a web of paper which passes over the platen structure, a feed roll for the web, a take-up roll and manually wound means for simultaneously raising the platen structure against the spring tension to a point wherein it is engaged by the latching means and for moving the take-up roll after each printing operation.

3. A printing device for recording readings on record wheels of accumulators comprising a housing to be temporarily applied to the accumulator, locating means for obtaining proper register between the device and the accumulator, a paper web, and feeding and take-up rolls therefor, means for forcing the web against the record wheels with an impact blow to obtain the reading comprising a platen structure including a spring plate mounted at one end thereof within the housing and with its other end free to travel, a resilient impact-delivering member carried by the free end of the plate, means for latching said free end under spring tension in inoperative position comprising a pivoted bell-crank lever, a latch associated with one leg thereof, the other leg forming a trigger and provided with a portion which contacts a surface of the accumulator to release the latch as the housing is moved into register, means for simultaneously latching the plate and moving the web one increment comprising a splined sleeve which contacts and moves the free end of the plate, and a manually wound shaft operatively connected with the take-up roll and with the sleeve.

4. A printing device for recording readings on record wheels of accumulators comprising a housing to be temporarily applied to the accumulator, guide means for obtaining proper register between the device and the accumulator, a paper web carried at the lower end of the housing which is movable relative to the record wheel, means for forcing the web against the record wheels with an impact blow to obtain the reading comprising a spring-urged platen, means for latching the platen in an upward position under spring tension comprising a pivoted bell crank lever, a latch associated with one leg thereof, the other leg forming a trigger which contacts a surface of the accumulator to release the latch as the housing is moved into register, and manually movable means connected with the web and the bell crank lever for simultaneously moving said parts to condition the device for a subsequent operation following the printing.

References Cited in the file of this patent

UNITED STATES PATENTS

| | | |
|---|---|---|
| 1,167,902 | Kennicott | Jan. 11, 1916 |
| 1,673,503 | Freed | June 12, 1928 |
| 1,794,845 | Gluck | Mar. 3, 1931 |
| 1,871,993 | Hubbard | Aug. 16, 1932 |
| 1,992,709 | Matt | Feb. 26, 1935 |
| 1,994,431 | May | Mar. 12, 1935 |
| 2,344,675 | Burts | Mar. 21, 1944 |
| 2,460,657 | Schmidt | Feb. 1, 1949 |
| 2,543,910 | Houston | Mar. 6, 1951 |